(12) United States Patent
Kidokoro et al.

(10) Patent No.: US 6,977,736 B1
(45) Date of Patent: Dec. 20, 2005

(54) IMAGE PROCESSING APPARATUS

(75) Inventors: Kazuaki Kidokoro, Yokohama (JP);
Nobuhisa Yoda, Kamakura (JP);
Tatsuya Haraguchi, Yokohama (JP);
Kazuhiro Ogura, Kawasaki (JP)

(73) Assignees: Kabushiki Kaisha Toshiba, Tokyo
(JP); Toshiba Tec Kabushiki Kaisha,
Tokyo (JP)

( * ) Notice: Subject to any disclaimer, the term of this patent is extended or adjusted under 35 U.S.C. 154(b) by 1051 days.

(21) Appl. No.: 09/641,338

(22) Filed: Aug. 18, 2000

(30) Foreign Application Priority Data

Aug. 20, 1999 (JP) ................................. 11-234087

(51) Int. Cl.[7] .......................... G06F 13/00; G06F 15/00
(52) U.S. Cl. .................... 358/1.13; 358/1.15; 345/840; 345/765; 345/771
(58) Field of Search .............................. 358/1.13, 468, 358/1.15; 345/840, 765, 771, 835

(56) References Cited

U.S. PATENT DOCUMENTS

| | | | | |
|---|---|---|---|---|
| 5,684,970 A | * | 11/1997 | Asuma et al. | 345/775 |
| 5,764,866 A | | 6/1998 | Maniwa | 395/114 |
| 5,907,319 A | * | 5/1999 | Hashimoto et al. | 345/173 |
| 6,301,611 B1 | * | 10/2001 | Matsumoto et al. | 709/217 |
| 6,559,967 B1 | * | 5/2003 | Akiba et al. | 358/1.16 |
| 2003/0214664 A1 | * | 11/2003 | Moffatt | 358/1.13 |

FOREIGN PATENT DOCUMENTS

JP            9-051398        2/1997

* cited by examiner

*Primary Examiner*—Edward Coles
*Assistant Examiner*—Alan Rahimi
(74) *Attorney, Agent, or Firm*—Foley & Lardner LLP (57) ABSTRACT

A digital copying machine provided with both a scanner function and a printer function is used. The use of this type of machine enables a scanner apparatus to have a printout function as well. An input image can be transmitted to a final registration destination or a transfer destination and printed by operating only the scanner apparatus. Owing to this feature, the user need not check the image output to the final registration destination, the user is only required to confirm the printed image. Hence, the burden imposed on the user by the confirmation of captured images is significantly reduced.

6 Claims, 5 Drawing Sheets

| ID 11 | BUTTON NAME 12 | DOCUMENT CREATOR 13 | PROCESSING CONTENT 14 | PROCESSING PARAMETER 15 | CAPTURE PARAMETER 16 |
|---|---|---|---|---|---|
| 1 | CAPTURE CATALOG | TAKAHASHI | STORE DATA IN FILE SERVER | TO ¥IMG¥CATALOG1, IN BITMAP FORMAT | 600DPI, MONOCHROMATIC TEXT MODE |
| 2 | CAPTURE LEAVE APPLICATION FORM | YOSHIDA | STORE DATA IN FILE SERVER | TO ¥IMG¥APPLICATION, IN TIFF FORMAT | 300DPI, FULL COLOR |
| 3 | CAPTURE MINUTES OF BUSINESS MEETING | YOSHIDA | SEND MAIL | TO take@TOKYO.co.jp IN BITMAP FORMAT | 300DPI, MONOCHROMATIC TEXT MODE |
| 4 | CAPTURE CATALOG OF NEW PRODUCT | MIKI | DB REGISTRATION | DB1 | 300DPI, MONOCHROMATIC PHOTOGRAPH MODE |
| ... | ... | ... | ... | ... | ... |

IMAGE PROCESSING APPARATUS

CROSS-REFERENCE TO RELATED APPLICATIONS

This application is based upon and claims the benefit of priority from the prior Japanese Patent Application No. 11-234087, filed Aug. 20, 1999, the entire contents of which are incorporated herein by reference.

BACKGROUND OF THE INVENTION

The present invention relates to an image processing apparatus that is provided with an image capturing function of creating an electronic image from a printed sheet document. The image processing apparatus is, for example, a scanner apparatus or a digital copying machine. The present invention also relates to an image processing method used in the image processing apparatus.

According to the prior art, where a scanner apparatus is used by a specific user or with a particular device, a single document is supplied to the scanner apparatus each time image capture is required. Where the scanner apparatus is used as such, images are registered in a fixed area (a fixed storage area), and the user checks the input images registered in the predetermined registration area of a file system to confirm the input image the user enters.

Large-capacity storage devices and networks are in common use in recent years, and the use of electronic-form documents is general in business. In offices, however, printed sheet documents still play an important role. In accordance with the computerization taking place in the environments of the user, there is an increasing demand for efficiently capturing printed sheet documents so that they can be used as electronic information.

With an increase in the necessity for image capture, it is necessary to process a large number of documents provided by different users. For enhancing the efficiency of image capturing operation, a high-speed and sophisticated scanner apparatus, an example of which is a digital copying machine, is connected to a network and is used in common by different users.

Although the sophisticated scanner provides remarkable advantages to the user, its processing is inevitably complex. For example, images input from the scanner are automatically transferred to external systems and registered there in accordance with the kind of processing designated by the user.

As can be seen from this, the sophisticated scanner apparatus does not necessarily have fixed destinations for registration. For this reason, the user has to access the external systems where the images are registered, so as to confirm whether the images have been input without any problems. This operation has been very troublesome to the user.

BRIEF SUMMARY OF THE INVENTION

As described above, the captured images have to be confirmed by accessing the external systems after the image capture, and the operations the user has to be for this confirmation are very troublesome. Accordingly, an object of the present invention is to provide an image processing apparatus and an image processing method which enable captured images to be confirmed by merely operating a scanner apparatus, thus eliminating the need to access the external systems for confirmation after image capture, and which therefore help simplify the operations performed by the user.

To attain the above purpose, the present invention provides an image processing apparatus comprising: a scanner for reading an image from a document; a designation button for associating document read processing performed by the scanner with the processing performed with respect to the image read by the scanner; an input section for inputting output contents which represent processing results preset for the designation button, when results of processing preset for the designation button are output; a controller for controlling execution of the processing preset for the designation button when the designation button is operated; and output means for outputting processing results in accordance with the output contents which represent processing results and which are input from the input means, when processing preset for the designation button is executed by the controller.

The present invention also comprises an image processing apparatus which is basically made up of a scanner for reading a document and a printer for forming an image read by the scanner on an image formation medium, and which comprises: a designation button for associating document read processing by the scanner with the processing performed with respect to the image read by the scanner; an input section for inputting image formation contents which represent processing results preset for the designation button, when the printer performs the image formation on the image formation medium by printing the processing results preset for the designation button; and a controller for executing the processing preset for the designation button when the designation button is designated, and for further controlling the printer to execute the image formation on the image formation medium by printing the processing results preset for the designation button, based on the image formation contents which represents the processing results and input from the input section.

The present invention further provides an image processing method used in an image processing apparatus provided with a scanner for reading a document image, the method comprising: a first step of associating document read processing performed by the scanner with the processing performed with respect to the image read by the scanner, and setting a designation button in accordance with association; a second step of setting the designation button in accordance with output contents used when processing results that are set for the designation button in the first step are output; a third step of executing the processing that is associated in the first step by use of the designation button, when the designation button is operated; and a fourth step of outputting results of the processing executed in the third step in accordance with the output contents, if the output contents are set for the designation button in the second step, the results of processing being output when the processing associated by use of the designation button is executed in the third step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

First of all, the structure of an image capturing apparatus will be described. The image capturing apparatus is an example of an image processing apparatus according to one embodiment of the present invention.

Figure 1:
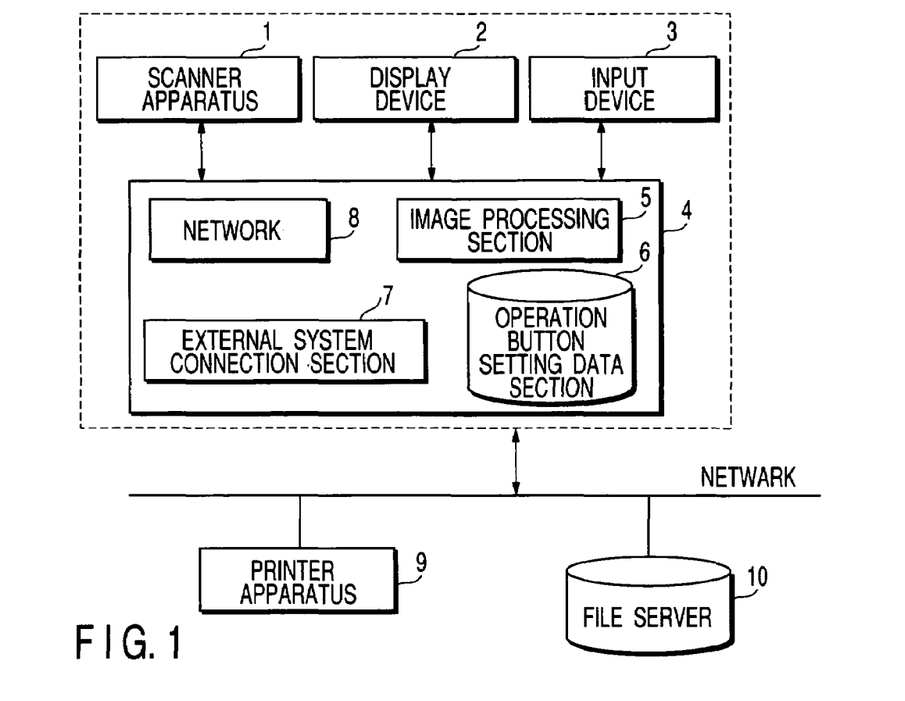
FIG. 1 is a block diagram showing a schematic structure of an image capturing apparatus according to an embodiment of the present invention.

FIG. 1 is a block diagram showing a schematic structure of the image capturing apparatus. As shown in FIG. 1, the image capturing apparatus comprises a scanner apparatus 1, a display device 2, an input device (an input section) 3, and a system control section (a controller) 4.

The scanner apparatus 1 is a hardware component serving as a scanner, and creates an electronic image from a printed sheet document. The display device 2 is a liquid crystal display unit with a built-in touch panel, and the input device 3 is an unsophisticated or simplified keyboard. The display device 2 displays the settings of the scanner apparatus 1 and the operation that is being executed. The input device 3 is used for receiving inputs from users. The system control section 4 controls the devices described above.

The system control section 4 includes an image processing section 5, an operation button setting data section 6, an external system connection section 7, and a print output section 8.

The image processing section 5 processes an image input from the scanner apparatus 1 in accordance with setting contents in the operation button setting data section 6. The external system connection section 7 is a section that accesses an external system when an image captured through the scanner apparatus 1 is registered or transferred to that external system. The external system is specifically a file server, a database system, a mail system, or the like.

Figure 2:
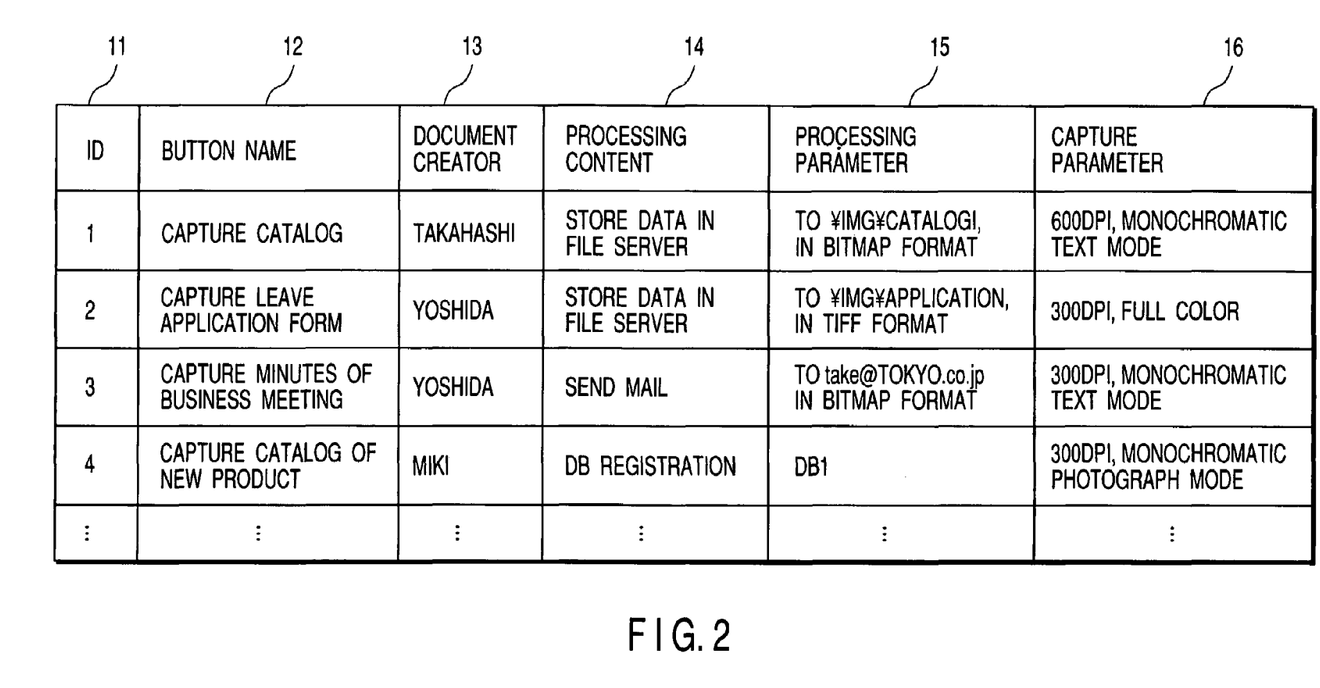
FIG. 2 shows an operation button setting data section of the image capturing apparatus.

The operation button setting data section 6 stores a plurality of setting data regarding operation buttons of the scanner apparatus 1 displayed in the display device 2. In the operation button setting data section 6, processing contents that are executed when an operation button is operated are stored. FIG. 2 is an example of the operation button setting data section 6.

The image capturing apparatus of the above structure is connected to a network. A printer apparatus 9 and a file server 10 are also connected to the network.

As shown in FIG. 2, the operation button setting data section 6 has an item 11 in which a plurality of button IDs are set forth, and each button ID includes a button name 12, a document creator 13, a processing content (i.e., the kind of processing) 14, a processing parameter 15, and a capture parameter 16.

In the button ID item, a plurality of IDs for identifying the respective operation buttons are recorded. The operation button identified by each button ID has a button name that enables users to know the operation content, and the button name is set in the button name item 12. In the document creator item 13, the name of the document creator, i.e., the person who determines the settings of the operation button, is recorded. In the processing kind item 14, the kind of processing assigned to the operation button is recorded. The kind of processing is related to the external system to which an image input by use of the operation button is transmitted, and is therefore determined after that external system is selected from available external systems.

The kind of processing is specified by a processing parameter. In the processing parameter item 15, processing parameters corresponding to selected external systems are recorded. In the capture parameter item 16, scan parameters that are preset for the operation buttons are recorded.

By way of example, let us consider the case where the operation of saving data in the file server 10 is assigned to an operation button of the operation button setting data section 6. In this case, the system control section 4 records an image, which is read from the scanner apparatus 1 beforehand, in the file server 10 on the network as a file.

The system control section 4 controls the print output section 8 so that the printer apparatus 9 connected to the network can print out the image input from the scanner apparatus 1. In the present embodiment, the printer apparatus 9 is connected to the image capturing apparatus through the network. However, this does not restrict the present invention. For example, a digital copying machine serves as both a scanner apparatus 1 and a printer apparatus 9, and the use of the digital copying machine is similar to the above-described embodiment except that the print output destination is inside the machine. The present invention can be applied to this case as well without the spirit of the invention changed.

Figure 3:
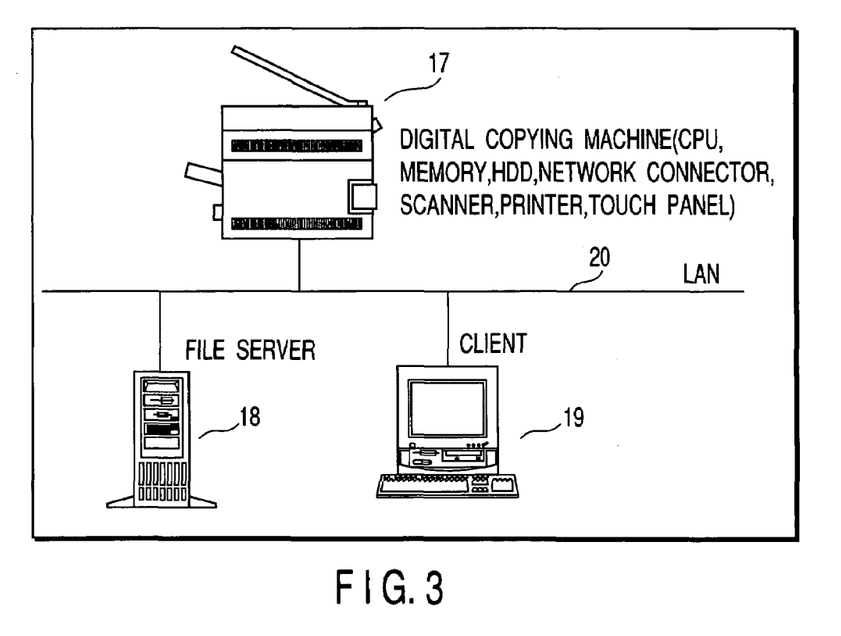
FIG. 3 shows an example of a system including the image capturing apparatus.

FIG. 3 shows an example of a system including the image capturing apparatus.

In the system shown in FIG. 3, a plurality of personal computers (PC: clients) 19, a digital copying machine 17 having a scanner function, and a file server 18 are connected to a local area network (LAN) 20.

With this structure, each PC 19 can receive and use a document image that is read by use of the scanner function of the digital copying machine 17. In other words, the scanner function of the digital copying machine 17 can be shared by the PCs 19.

Although not shown, the digital copying machine 17 is provided with a keyboard, a mouse, a display section, a LAN board, etc.

The digital copying machine 17 has both a scanner function and a printer function. It incorporates a CPU (a control section) and a memory, and by use of these controls it reads a program out of an HDD and controls the hardware. The digital machine 17 is operated by means of a touch panel (i.e., an input section). The digital copying machine 17 also incorporates a network control device and can access the file server 18 through the network 20.

The user can access the file server 18 through the network 20 by using the PC 19 as a client.

Figure 4:
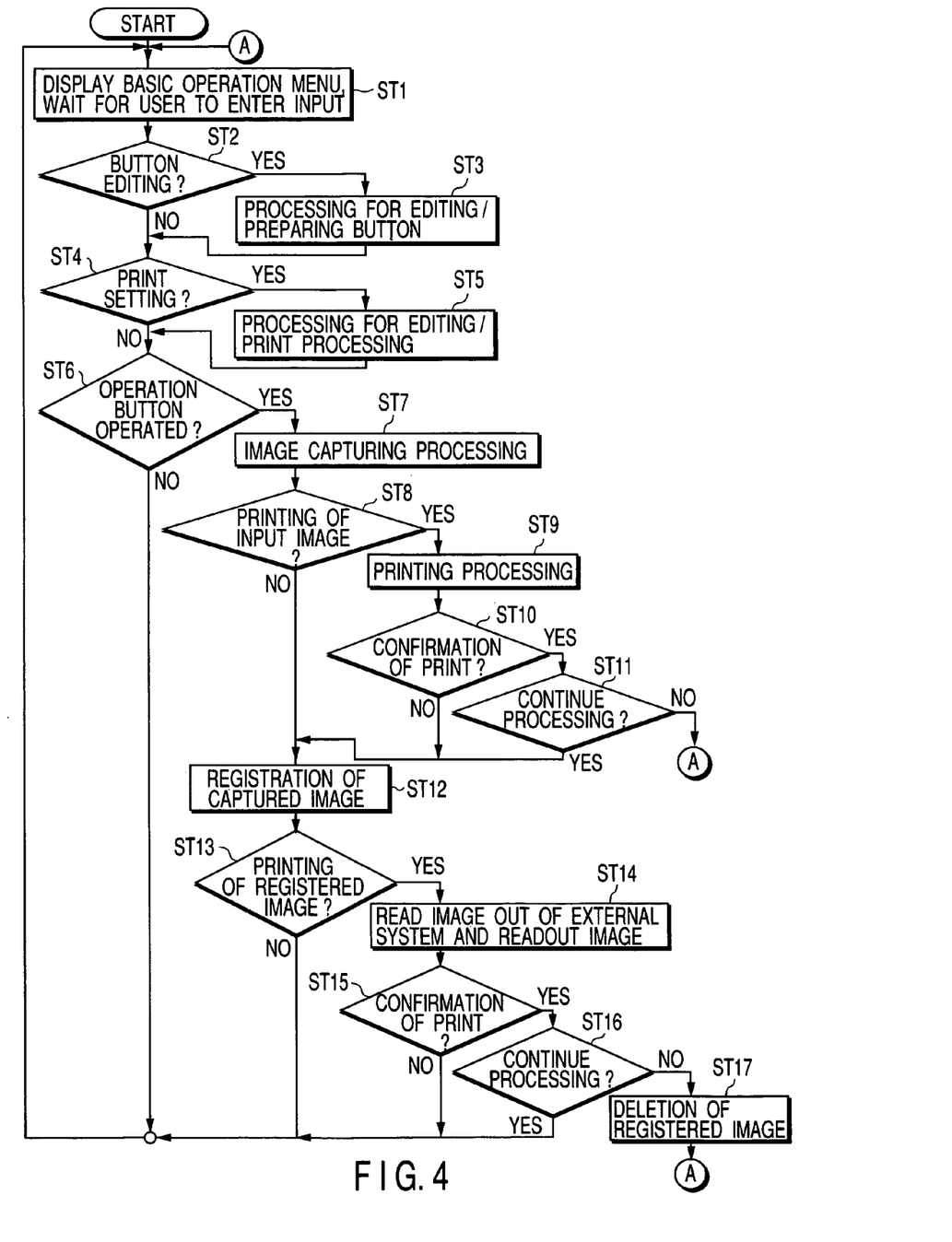
FIG. 4 is a flowchart illustrating the processing executed by the image capturing apparatus.

FIG. 4 is a flowchart illustrating how the processing executed by the image capturing apparatus of the above structure operates.

Figure 5:
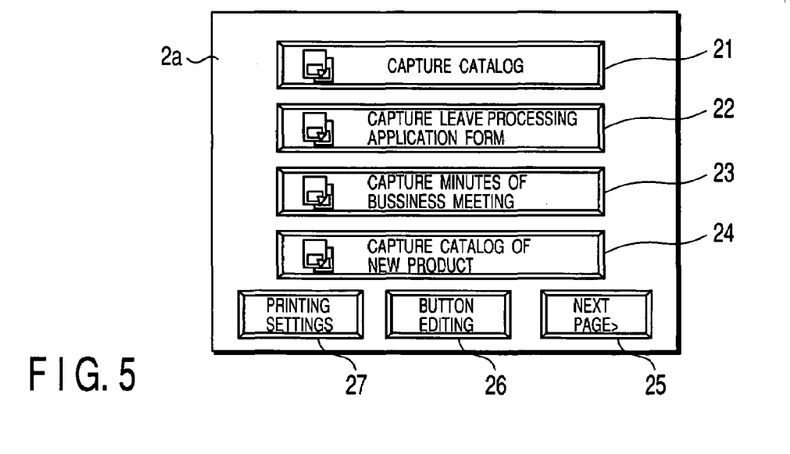
FIG. 5 shows a basic operation menu.

When the image capturing apparatus is started up, the system control section 4 displays a basic operation menu 2a on the touch panel (input device) 3, and waits for the user to enter an input (Step 1). As shown in FIG. 5, the basic operation menu 2a has, for example, the following: various operation buttons (designation buttons) 21–24, a next-page button 25, a button edit key 26, and a print setting button 27. The operation buttons 21–24 are selectively operated to execute operations preset for them. The displayed names of the operation buttons 21–24 are set and registered in the operation button setting data section 6. The next-page button 25 is displayed when the number of operation buttons is too large to display on one menu. When the next-page button 25 is operated, the operation buttons of the next group are shown.

Figure 6:
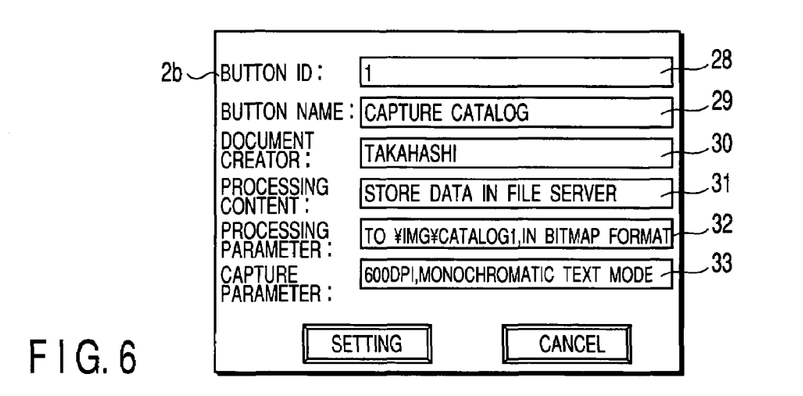
FIG. 6 shows an edit menu for editing an operation button.

When the user operates the button edit key 26 to select the editing of the operation buttons (Step 2), an edit menu 2b used for editing the operation buttons is displayed, as shown in FIG. 6. On the edit menu 2b, a button ID, a button name, a document creator, the kind of processing, a processing parameter, and a capture parameter are indicated. These items are indicated by numerals 28–33, respectively. A setting key and a cancel key are also indicated.

The user enters data in the items 28–33 by operating the input device 3, and touches the setting key. As a result, the editing or preparation of the operation buttons is completed (Step 3), and operation button settings entered by the user are recorded in the operation button setting data section 6. The operation button settings are displayed on the basic operation menu 2a shown in FIG. 5.

Figure 7:
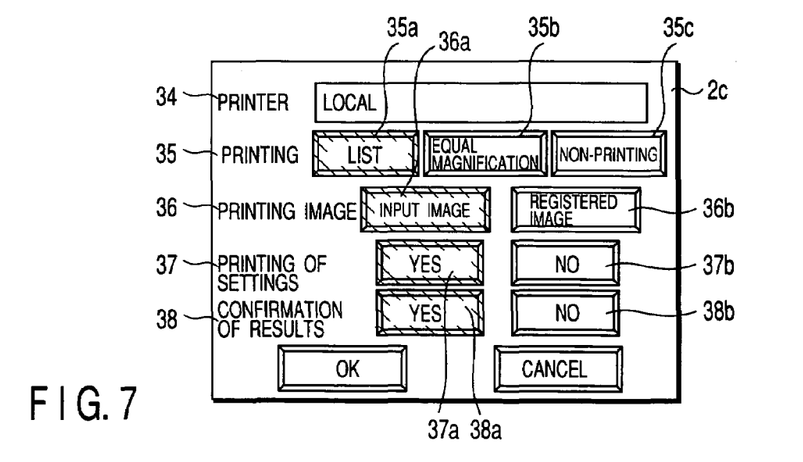
FIG. 7 shows a print setting menu.

When the user operates the print setting button 27 to select a print setting mode (step 4), the system control section 4 controls the display device 2 to shown a print setting menu 2c, as shown in FIG. 7. On the print setting menu 2c, contents of various items 34–38, such as "printer", "printing", "printed image", "printing of settings" and "confirmation of results" are displayed as setting buttons by the touch panel (input device) 3. An OK key and a cancel key are also indicated.

The print settings on the print setting menu 2c are determined so as both to process an image from the scanner apparatus 1 in accordance with the settings corresponding to an operation button and to print out the image (Step 5).

The printing settings on the print setting menu 2c will be described.

In the item 34 of the "printer", a printer device used for output is designated. In the example shown in FIG. 7, "local" is indicated in that item, which means that the scanner apparatus 1 and the printer apparatus 9 are incorporated in the same apparatus.

In the item 35 of the "printing", a manner of printing is designated by selecting a "list" key 35a, an "equal magnification" key 35b, or a "non-printing" key 35c. For example, when the "list" key 35a is selected, thumbnail images (e.g., reduced images) of input images corresponding to a plurality of pages are printed out in such a manner that the list contain a preset number of pages. When the "equal magnification" key 35b is selected, an input image is printed with the same magnification. When no print output is required, the "non-printing" key 35c is selected.

In the Item 36 of the "print image", an image to be output is determined by selecting either an "input image" key 36a or a "registered image" key 36b. When the "input image" key 36a is selected, an image input from the scanner apparatus is designated for printing. When the "registered image" key 36b is selected, an image registered in an external system is designated as an image to be read out and printed. The reason the "registered image" key 36b is provided is that an input image cannot be always registered in the external system. In other words, the image may not be correctly registered due to some error. This being so, the registered image is printed for confirmation. By using this function, it is possible to confirm whether an input image from the scanner apparatus has been successfully transmitted to the external system.

In the item 37 of the "printing of settings", either a "Yes" key 37a or a "No" key 37b is selected to designate whether the setting contents corresponding to an operation button should be added when an image is to be printed. By including the setting contents corresponding to the operation button in the printed image, it is possible to confirm not only the image itself but also the processing executed with respect to the image.

The item 38 of the "confirmation of results" enables the user to determine whether to perform the processing preset for the operation button. The user can determine this on the touch panel of the scanner apparatus 1, in accordance with a print output result. To be more specific, when the processing registered for the operation button should be executed after the confirmation of the result of printing, a "Yes" key 38a is designated. When the processing registered for the operation button should be executed without reference to the result of printing, a "No" key 38b is designated.

Owing to this process, the user can look at a print output to check whether a document skews when it is read, or if there is a not-read page. After confirming these, the user can determine whether or not to execute the processing preset for the operation button.

When the "OK" key on the touch panel is selected after the contents of the items 34–38 of the print setting menu 2c are determined, the print setting contents are stored and take effect.

Next, one of the operation buttons of the basic operation menu 2a shown in FIG. 5 is operated (Step 6). In response to this, the system control section 4 controls the scanner apparatus 1 to start reading an original in accordance with the capture parameter preset for the operation button selected in the operation button setting data section 6 (Step 7).

Figure 8:
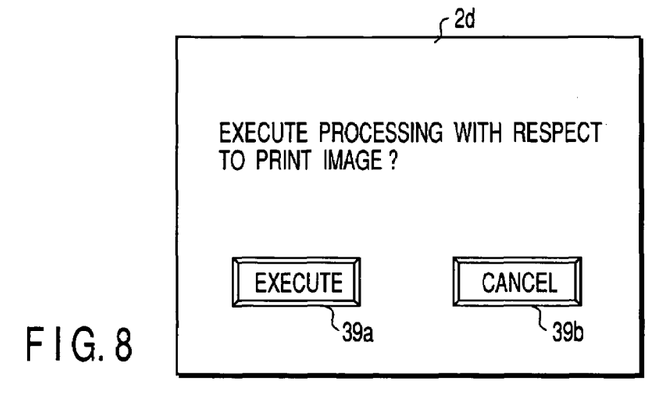
FIG. 8 shows a confirmation menu for displaying a print result.

Then, the document is read in accordance with the parameter corresponding to the operation button. After the start of this read operation, the system control section 4 determines whether or not the printing for the "input image" in the item of the "print image" is selected under the print settings shown in FIG. 7 (Step 8). When the determination shows that the printing for the input image is selected under the print settings, the input image is printed in accordance with the print settings (Step 9). In the case where the confirmation of the result of printing is designated by the print settings (Step 10), the system control section 4 displays a print result confirmation menu 2d, such as that shown in FIG. 8. This menu is displayed at the end of the print output of the input image. In the print result confirmation menu 2d, either an "execute" key 39a or a "cancel" key 39b is designated (Step 11). By this designation, it is possible to determine whether the processing preset for the operation button should be executed or canceled.

Where it is determined in Step 8 that the printing for the "input image" is not performed, where it is determined in Step 10 that the confirmation of the result of printing is not performed, or where it is determined in Step 11 that the processing should be continued, by checking that the "execute" key 39a in the print result confirmation menu 2d is operated, the system control section 4 transmits a captured image to an external system in accordance with the settings of an operation button (registration processing) (Step 12).

When the printing of the "registered image" is selected in the "print image" item 36 of the print setting menu 2c shown in FIG. 7 (Step 13), the system control section 4 reads out an image from an external system and prints the readout image in accordance with print settings (Step 14).

This processing is intended to confirm that an image registration has been successfully executed in Step 12. Hence, the registered image is read out from the external system, which is the registration destination, and printed out. For example, where a file server is designated as a registration destination, an image that is stored as a file in the designated directory of the file server is read and printed out.

Where the confirmation of the result of printing is selected in the "confirmation of results" item 38 shown in FIG. 7, the system control section 4 displays the print result confirmation menu 2d at the end of the printout operation of the registered image (Step 15), as shown in FIG. 8. After confirming the contents of the printout, the user can determine whether the processing preset for the operation button should be executed or canceled.

When the results of printing are satisfactory, the user designates the "execute" key 39a (Step 16), and the processing is brought to an end. If the "cancel" key 39b is designated in the print result confirmation menu 2d shown in FIG. 8, the system control section 4 deletes the image registered in the external system (Step 17) since the registration processing of the input image is being executed then. Then, the processing starting from Step 1 is executed again.

Figure 9:
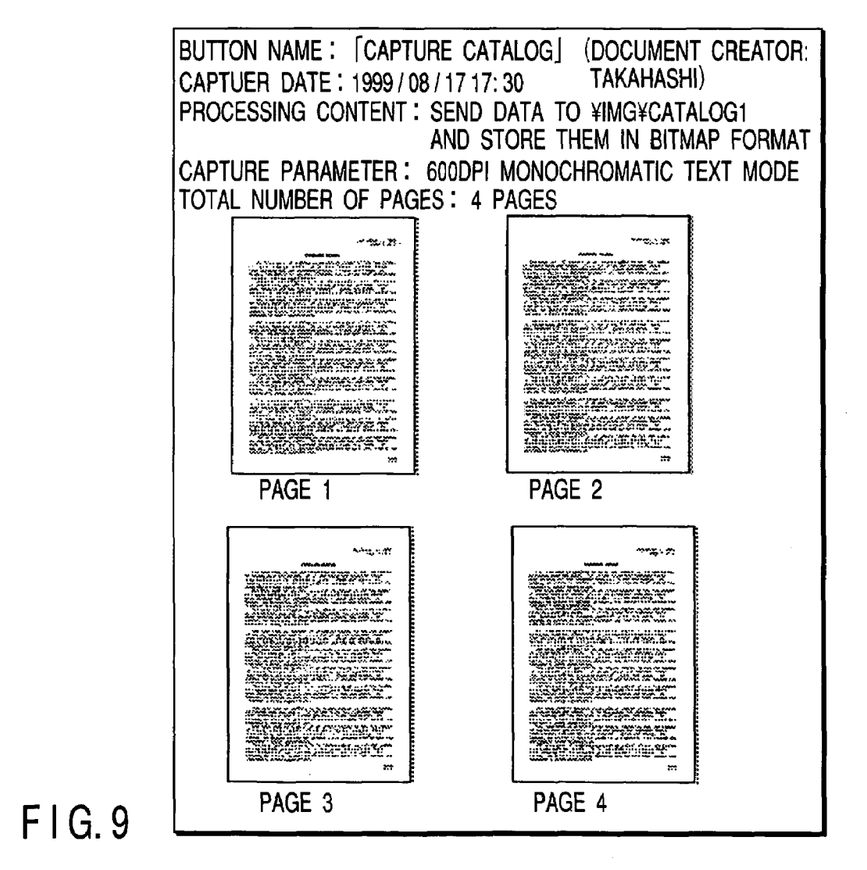
FIG. 9 shows an output example of a print result.

FIG. 9 shows an example of a print result output by the present apparatus. The example is a list of thumbnail images of input images, the thumbnail images being printed out together with the setting contents preset for the operation button.

By looking at the print output, the user can confirm whether or not the document has been successfully input. The user can also know to which external system, and in what manner, the image is to be output. Further, the user can know how it is registered.

As described above, a digital copying machine is provided with both a scanner function and a printer function, and the use of such a digital copying machine means that a scanner apparatus has a printout function as well. That is, an input image can be transmitted to a final registration/transfer destination and printed out by operating only the scanner apparatus. Owing to this feature, the user need not check the image output to the final registration destination; the user is only required to confirm the printed image. Hence, the confirmation of captured images does not impose a heavy load on the user.

As detailed above, the present invention can provide an image processing apparatus and an image processing method which enable captured images to be confirmed by merely operating a scanner apparatus, thus eliminating the need to access an external systems for confirmation after image capture, and which simplify the operations performed by the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a scanner which reads image information from a document;
a designation button which associates first processing in which the image information of the document is read by the scanner with second processing performed with respect to the image information read by the scanner;
an input section which sets output contents in association with the designation button, based on which the image information read by the scanner in the first processing is printed by a printer;
a controller which controls execution of the first processing and second processing preset for the designation button when the designation button is operated; and
an output section which outputs the image information read by the scanner in the first processing to the printer in accordance with the output contents which are set by the input section, when the first processing and second processing preset for the designation button is executed by the controller,
wherein the controller cancels the image information read by the scanner when cancellation of the second processing is instructed after executing the first processing, and the controller executes the second processing when execution of the second processing is instructed, and
wherein said input section includes a setting button used for determining whether or not processing contents associated by use of the designation button should be output together with the image information that is read by the scanner under control performed by the controller.

2. An image processing apparatus comprising:
a scanner which reads image information from a document;
a designation button which associates first processing in which the image information of the document is read by the scanner with second processing performed with respect to the image information read by the scanner;
an input section which sets output contents in association with the designation button, based on which the image information read by the scanner in the first processing is printed by a printer;
a controller which controls execution of the first processing and second processing preset for the designation button when the designation button is operated; and
an output section which outputs the image information read by the scanner in the first processing to the printer in accordance with the output contents which are set by the input section, when the first processing and second processing preset for the designation button is executed by the controller,
wherein the controller cancels the image information read by the scanner when cancellation of the second processing is instructed after executing the first processing, and the controller executes the second processing when execution of the second processing is instructed, and wherein said input section includes a setting button used for determining which image, the image information read by the scanner under control performed by the controller or an image obtained by processing the image read by the scanner, should be output.

3. An image processing apparatus incorporating both a scanner which reads image information and a printer which forms an image from the image information read by the scanner on an image formation medium, said image processing apparatus comprising:
   a designation button which associates first processing in which image information of a document is read by the scanner with second processing performed with respect to the image information read by the scanner;
   an input section which sets print contents in association with the designation button, based on which the image information read by the scanner in the first processing is printed by a printer; and
   a controller which executes the first processing preset for the designation button when the designation button is designated, and which further controls the printer to form an image corresponding to the image information read by the scanner in the first processing based on the print contents which are set by the input section,
   wherein the controller cancels the image information read by the scanner when cancellation of the second processing is instructed after executing the first processing, and the controller executes the second processing when execution of the second processing is instructed, and
   wherein said input section includes a setting button used for determining whether or not processing contents associated by use of the designation button should be output together with the image information that is read by the scanner under control performed by the controller.

4. An image processing apparatus incorporating both a scanner which reads image information and a printer which forms an image from the image information read by the scanner on an image formation medium, said image processing apparatus comprising:
   a designation button which associates first processing in which image information of a document is read by the scanner with second processing performed with respect to the image information read by the scanner;
   an input section which sets print contents in association with the designation button, based on which the image information read by the scanner in the first processing is printed by a printer; and
   a controller which executes the first processing preset for the designation button when the designation button is designated, and which further controls the printer to form an image corresponding the image information read by the scanner in the first processing based on the print contents which are set by the input section,
   wherein the controller cancels the image information read by the scanner when cancellation of the second processing is instructed after executing the first processing, and the controller executes the second processing when execution of the second processing is instructed, and
   wherein said input section includes a setting button used for determining which image, the image information read by the scanner under control performed by the controller or image information obtained by processing the image information read by the scanner, should be output.

5. An image processing method used in an image processing apparatus provided with a scanner for reading a document image, said method comprising:
   associating first processing in which image information of a document is read by the scanner with second processing performed with respect to the image information read by the scanner, and setting a designation button in accordance with association;
   setting output contents in association with the designation button, based on which the image information read by the scanner in the first processing is printed by a printer;
   executing the first processing and second processing that are associated by use of the designation button, when the designation button is operated;
   outputting the image information read by the scanner in the first processing to the printer in accordance with the output contents that are set in association with the designation button when executing the first processing and second processing associated by use of the designation button; and
   canceling the image information read by the scanner in the first processing when cancellation of the second processing is instructed after executing the first processing, and executing the second processing when executing of the second processing is instructed,
   wherein said setting the output contents includes determining whether or not processing contents associated by use of the designation button should be output together with the image information that is read by the scanner as the first processing and second processing that are associated by use of the designation button.

6. An image processing method used in an image processing apparatus provided with a scanner for reading a document image, said method comprising:
   associating first processing in which image information of a document is read by the scanner with second processing performed with respect to the image information read by the scanner, and setting a designation button in accordance with association;
   setting output contents in association with the designation button, based on which the image information read by the scanner in the first processing is printed by a printer;
   executing the first processing and second processing that are associated by use of the designation button, when the designation button is operated;
   outputting the image information read by the scanner in the first processing to the printer in accordance with the output contents that are set in association with the designation button when executing the first processing and second processing associated by use of the designation button; and
   canceling the image information read by the scanner in the first processing when cancellation of the second processing is instructed after executing the first processing, and executing the second processing when executing of the second processing is instructed,
   wherein said setting the output contents includes determining which image information, the image information read by the scanner as the first processing and second processing that are associated by use of the designation button or image information obtained by processing the image information read by the scanner, should be output.

* * * * *